W. O. Drew,
Bread Machine,
N̲º̲ 38,037. Patented Mar. 31, 1863.
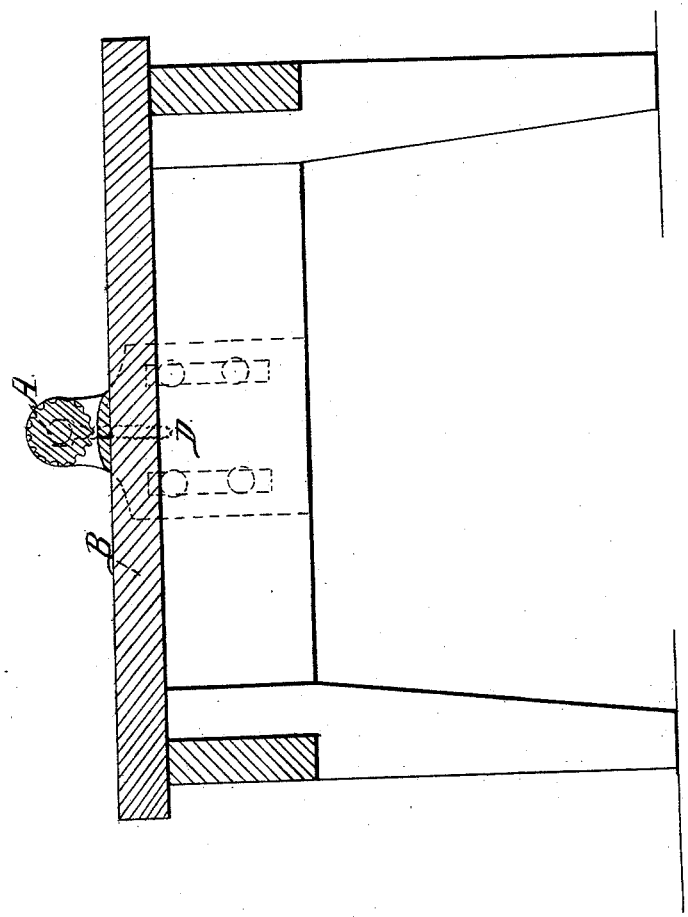
Witnesses.
Charles Alexander
Jo. C. Clayton
Inventor.
Wm O Drew
Pr C. M. Alexander Atty

UNITED STATES PATENT OFFICE.

WILLIAM O. DREW, OF GEORGETOWN, DISTRICT OF COLUMBIA.

IMPROVED MACHINE FOR MAKING BREAD.

Specification forming part of Letters Patent No. 38,037, dated March 31, 1863.

*To all whom it may concern:*

Be it known that I, WILLIAM O. DREW, of the city of Georgetown, and District of Columbia, have invented certain new and useful Improvements in Apparatus for Bread-Making; and I hereby declare that the following is a true and exact description of the same, reference being had to the accompanying drawing, and to the letters of reference marked thereon.

Figure 1 in the drawing represents a vertical section of a common kitchen-table with my invention attached.

The letter A represents a fluted roller extending across the table B at right angles with its length. The size and length will depend upon the quantity of dough required to be kneaded. The roller A has pivots at each end which work in holes through the adjustable metal plates marked D. These plates have two slots cut in each, with screws passing through them, by means of which the roller can be elevated or lowered at pleasure. Underneath the roller A is the feeder C, running in a line with A, and extending an inch (more or less) beyond the sides of the roller A. The feeder C is a board having a plane surface next to the table and slightly convex on the upper side. The distance between the roller A and the feeder C is to be regulated according to the quantity of dough designed to pass between them. The roller A receives its motion by means of a crank at the end of A. (Shown in dotted lines.)

The plates D can be screwed to an ordinary kitchen-table, and my machine set to work with little expense.

The mode of operation is simply as follows: First roll the dough out with a rolling-pin, then put the edge of it on the convex C and in contact with the roller A. Turn the cylinder A rapidly by means of the crank, and when the dough is nearly through reverse the motion of A, and continue this operation until that portion of the dough exposed to the action of the roller A is sufficiently kneaded. Then double the batch until the edges come to the center, and repeat the operation with the roller A until the process of kneading is completed.

Ten minutes' working of my machine is equivalent to an hour's kneading with the hands, and one-fourth of the quantity of butter or lard ordinarily used for shortening the bread will make the article of a superior quality.

Having thus described my machine, what I claim, and desire to secure by Letters Patent, is—

The fluted roller A, the convex C, and the adjustable plates D, the whole arranged and combined substantially as set forth and described.

In testimony that I adopt the foregoing as my own I hereby affix my signature in the presence of two witnesses.

WM. O. DREW.

Witnesses:
 JOHN P. JACOBS,
 CHARLES ALEXANDER.